(12) United States Patent
Li et al.

(10) Patent No.: US 11,438,212 B2
(45) Date of Patent: Sep. 6, 2022

(54) FAULT ROOT CAUSE ANALYSIS METHOD AND APPARATUS

(71) Applicant: HUAWEI TECHNOLOGIES CO., LTD., Guangdong (CN)

(72) Inventors: Jian Li, Shenzhen (CN); Zengjun Huang, Dongguan (CN); Min Hu, Dongguan (CN); Bo Xie, Beijing (CN); Kang Cheng, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/120,605

(22) Filed: Dec. 14, 2020

(65) Prior Publication Data

US 2021/0099336 A1    Apr. 1, 2021

Related U.S. Application Data

(63) Continuation of application No. PCT/CN2019/091207, filed on Jun. 14, 2019.

(30) Foreign Application Priority Data

Jun. 15, 2018 (CN) .......................... 201810623804.5

(51) Int. Cl.
*H04L 41/0631* (2022.01)
*H04L 41/069* (2022.01)
*H04L 43/04* (2022.01)

(52) U.S. Cl.
CPC ........ *H04L 41/0636* (2013.01); *H04L 41/064* (2013.01); *H04L 41/069* (2013.01); *H04L 43/04* (2013.01)

(58) Field of Classification Search
CPC . H04L 41/0636; H04L 41/064; H04L 41/069; H04L 43/04

(Continued)

(56) References Cited

U.S. PATENT DOCUMENTS 9,442,785 B2 * 9/2016 Watanabe ........... G06F 11/0727
9,729,571 B1 * 8/2017 Ferguson .............. H04L 63/306

(Continued)

FOREIGN PATENT DOCUMENTS

CN      101707537 A     5/2010
CN      102136949 A     7/2011

(Continued)

OTHER PUBLICATIONS

Klaus Julisch. 2003. Clustering intrusion detection alarms to support root cause analysis. <i>ACM Trans. Inf. Syst. Secur.</i> 6, 4 (Nov. 2003), 443-471. DOI:https://doi.org/10.1145/950191.950192 (Year: 2003).*

(Continued)

*Primary Examiner* — Melvin H Pollack
(74) *Attorney, Agent, or Firm* — Womble Bond Dickinson (US) LLP

(57) ABSTRACT

A fault root cause analysis method and apparatus are provided. The method includes: obtaining a first alarm event set, where the first alarm event set includes a plurality of alarm events; for a first alarm event in the first alarm event set, extracting a feature vector of the first alarm event, where a part of or all features of the feature vector are used to represent a relationship between the first alarm event and another alarm event in the first alarm event set; and determining, based on the feature vector of the first alarm event, whether the first alarm event is a root cause alarm event. In this application, whether the first alarm event is the root cause alarm event is determined based on a feature vector of the relationship between the first alarm event and the another alarm event, and the accuracy of fault root cause identification is improved.

20 Claims, 6 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 10,055,481 | B2* | 8/2018 | Ideses .................... | G06F 16/245 |
| 10,135,701 | B2* | 11/2018 | Wu ...................... | H04L 43/0876 |
| 10,177,998 | B2* | 1/2019 | Parandehgheibi .. | G06F 9/45558 |
| 10,193,780 | B2* | 1/2019 | Gopalakrishnan ... | G06K 9/6247 |
| 10,209,956 | B2* | 2/2019 | Fletcher ............... | H04L 41/069 |
| 10,237,294 | B1* | 3/2019 | Zadeh ................. | H04L 63/1425 |
| 10,284,453 | B2* | 5/2019 | Bell ....................... | H04L 41/064 |
| 10,372,120 | B2* | 8/2019 | Patil .................... | G05B 23/0243 |
| 10,417,079 | B2* | 9/2019 | Zasadzinski .......... | G06F 11/079 |
| 10,467,083 | B2* | 11/2019 | Settle ................... | G06F 11/079 |
| 10,523,495 | B2* | 12/2019 | Jacobs ............... | G05B 23/0235 |
| 10,579,928 | B2* | 3/2020 | Wang .................... | G06F 11/008 |
| 10,635,565 | B2* | 4/2020 | Dang ................... | G06K 9/6284 |
| 10,685,043 | B2* | 6/2020 | Brew .................. | G06F 16/2358 |
| 10,721,256 | B2* | 7/2020 | Urmanov .............. | G06F 21/552 |
| 10,742,482 | B2* | 8/2020 | Tellado ................... | H04L 41/22 |
| 10,771,313 | B2* | 9/2020 | Tedaldi ............... | H04L 41/0636 |
| 10,778,566 | B2* | 9/2020 | Mermoud ............. | H04L 43/045 |
| 10,785,090 | B2* | 9/2020 | Vasseur ................... | H04L 41/14 |
| 10,785,237 | B2* | 9/2020 | Mestha .................. | G06N 7/005 |
| 10,901,832 | B2* | 1/2021 | Farahat .............. | G06Q 30/0283 |
| 10,914,608 | B2* | 2/2021 | Chen .................. | G06K 9/00536 |
| 10,915,425 | B2* | 2/2021 | Wang .................. | G06F 11/0715 |
| 10,917,419 | B2* | 2/2021 | Crotinger ............ | G06F 11/3452 |
| 10,979,304 | B2* | 4/2021 | Tee ......................... | H04L 67/36 |
| 11,049,004 | B1* | 6/2021 | Segev ................. | G06F 11/0721 |
| 11,176,464 | B1* | 11/2021 | Sagi ........................ | G06N 5/04 |
| 2017/0180509 | A1 | 6/2017 | Dhawan et al. | |
| 2018/0091378 | A1 | 3/2018 | Tee et al. | |
| 2019/0196460 | A1* | 6/2019 | Rosca ..................... | G06N 5/022 |
| 2019/0197397 | A1* | 6/2019 | Verma ...................... | G06N 3/08 |
| 2019/0268215 | A1* | 8/2019 | Tellado ............... | H04L 41/0613 |
| 2019/0324831 | A1* | 10/2019 | Gu ....................... | G06F 11/0778 |
| 2019/0349391 | A1* | 11/2019 | Elsner .................. | G06K 9/6215 |
| 2019/0354805 | A1* | 11/2019 | Hind ....................... | G06N 20/20 |
| 2019/0356535 | A1* | 11/2019 | Li .......................... | H04L 41/0681 |
| 2020/0336394 | A1* | 10/2020 | Mathur ................ | H04L 41/0609 |
| 2020/0342333 | A1* | 10/2020 | Sigtermans ......... | G03F 7/70508 |

FOREIGN PATENT DOCUMENTS

| | | |
|---|---|---|
| CN | 103346912 A | 10/2013 |
| CN | 103746831 A | 4/2014 |
| CN | 106941423 A | 7/2017 |
| CN | 107171819 A | 9/2017 |
| CN | 107770797 A | 3/2018 |
| CN | 108156037 A | 6/2018 |
| WO | 2017008197 A1 | 1/2017 |
| WO | 2017059807 A1 | 4/2017 |

OTHER PUBLICATIONS

Kliger S., Yemini S., Yemini Y., Ohsie D., Stolfo S. (1995) A Coding Approach to Event Correlation. In: Sethi A.S., Raynaud Y., Faure-Vincent F. (eds) Integrated Network Management IV. IM 1995. IFIP—The International Federation for Information Processing. (Year: 1995).*

Sankar Mahadevan, Sirish L. Shah, Fault detection and diagnosis in process data using one-class support vector machines, Journal of Process Control, ScienceDirect, vol. 19, Issue 10, 2009, pp. 1627-1639, ISSN 0959-1524, https://doi.org/10.1016/j.jprocont.2009.07.011. (Year: 2009).*

M. Thottan and Chuanyi Ji, "Anomaly detection in IP networks," in IEEE Transactions on Signal Processing, vol. 51, No. 8, pp. 2191-2204, Aug. 2003, doi: 10.1109/TSP.2003.814797. (Year: 2003).*

M. Hasan, et al., "A conceptual framework for network management event correlation and filtering systems," Integrated Network Management VI. Distributed Management for the Networked Millennium. Proceedings 6th IFIP/IEEE International Symposium on Integrated Network Management, 1999, pp. 233-246. (Year: 1999).*

Tongyan Li, Xingming Li, Novel alarm correlation analysis system based on association rules mining in telecommunication networks, Information Sciences, ScienceDirect, vol. 180, Issue 16, 2010, pp. 2960-2978, ISSN 0020-0255, https://doi.org/10.1016/j.ins.2010.04.013. (Year: 2010).*

R. D. Gardner and D. A. Harle, "Methods and systems for alarm correlation," Proceedings of GLOBECOM'96. 1996 IEEE Global Telecommunications Conference, 1996, pp. 136-140 vol. 1, doi: 10.1109/GLOCOM.1996.594348. (Year: 1996).*

Ma Igorzata Steinder, Adarshpal S. Sethi, A survey of fault localization techniques in computer networks, Science of Computer Programming, ScienceDirect, vol. 53, Issue 2, 2004, pp. 165-194, ISSN 0167-6423, https://doi.org/10.1016/j.scico Jan. 10, 2004 (Year: 2004).*

Chao, C.S., Yang, D.L. & Liu, A.C. An Automated Fault Diagnosis System Using Hierarchical Reasoning and Alarm Correlation. Journal of Network and Systems Management 9, 183-202 (2001). https://doi.org/10.1023/A:1011315125608 (Year: 2001).*

Iulia Gabriela Carjeu et al.,"Clustering IT Events around Common Root Causes",2014 IEEE International Conference on Services Computing,DOI 10.1109/SCC.2014.102, total:10pages.

Dapeng Liu et al.,"Opprentice:Towards Practical and Automatic Anomaly Detection Through Machine Learning", IMC"15, Oct. 28-30, 2015, Tokyo, Japan,2015 ACM. ISBN 978-14503-3848-6/15/10,total:14pages.

* cited by examiner

FAULT ROOT CAUSE ANALYSIS METHOD AND APPARATUS

CROSS-REFERENCE TO RELATED APPLICATIONS

This application is a continuation of International Application No. PCT/CN2019/091207, filed on Jun. 14, 2019, which claims priority to Chinese Patent Application No. 201810623804.5, filed on Jun. 15, 2018. The disclosures of the aforementioned applications are hereby incorporated by reference in their entireties.

TECHNICAL FIELD

This application relates to the field of information technologies, and in particular, to a fault root cause analysis method and apparatus.

BACKGROUND

With expansion of a network scale and an increase of various network devices, these network devices generate a massive quantity of alarms of various types. This brings great pressure to an operations support system (OSS). Because a large quantity of alarms that do not need attention, such as invalid alarms and repeated alarms, exist in the massive quantity of alarms, an O&M engineer cannot accurately identify fault root causes from the quantity of massive alarms. As a result, troubleshooting efficiency is low and a large quantity of trouble tickets are dispatched, wasting manpower and increasing O&M costs.

In the prior art, to improve the troubleshooting efficiency and reduce the quantity of dispatched trouble tickets, data of an alarm event, for example, a type name of the alarm event, is used to determine whether the alarm event is a root cause, but accuracy is low.

In conclusion, improving the accuracy of fault root cause identification is a problem that needs to be resolved currently.

SUMMARY

This application provides a fault root cause analysis method and apparatus, to resolve a problem in the prior art that accuracy of fault root cause identification is low.

According to a first aspect, an embodiment of the application provides a fault root cause analysis method. The method includes:

obtaining a first alarm event set, where the first alarm event set includes a plurality of alarm events; for a first alarm event in the first alarm event set, extracting a feature vector of the first alarm event, where a part of or all features of the feature vector are used to represent a relationship between the first alarm event and another alarm event in the first alarm event set; and determining, based on the feature vector of the first alarm event, whether the first alarm event is a root cause alarm event.

According to the foregoing method, the fault root cause analysis apparatus extracts the feature vector of the first alarm event in the first alarm set from a plurality of dimensions, and determines, by using the feature vector of the relationship between the first alarm event and the another alarm event, whether the first alarm event is the root cause alarm event, thereby improving the accuracy of the fault root cause identification.

In an embodiment, the determining, based on the feature vector of the first alarm event, whether the first alarm event is a root cause alarm event includes: inputting the feature vector of the first alarm event into a preset classification model, to determine whether the first alarm event is the root cause alarm event, where the classification model is used to represent a relationship between a feature vector and a root cause alarm event.

In the method, whether the first alarm event is the root cause alarm event is determined by using the preset classification model, and the accuracy of the fault root cause identification is further improved by using a machine learning method.

In an embodiment, the obtaining a first alarm event set includes: aggregating the plurality of alarm events into at least one alarm event set, and using one of the at least one alarm event set as the first alarm event set.

In the method, that determining how to obtain the first alarm event set is an indispensable operation for implementing the method in this application.

In an embodiment, the aggregating the plurality of alarm events into at least one alarm event set includes:

aggregating the plurality of alarm events into at least one alarm event set according to a specified rule, where the specified rule includes at least one of a time correlation, a topology correlation, and a text similarity, where the time correlation is used to represent an association relationship between alarm events in time, the topology correlation is used to represent an association relationship between the alarm events in physical location, and the text similarity is used to represent a similarity degree between character strings when the alarm events are represented by using the character strings.

In an embodiment, the feature vector includes at least one of an alarm severity level, an alarm name, and an event type, and at least one of an association attribute, a time sequence relationship, a quantity relationship, and a resource relationship, where the association attribute is used to represent an association relationship between the first alarm event and the another alarm event in the first alarm event set, the quantity relationship is used to represent a ratio of a total quantity of all alarm events including the first alarm event that are the same as the first alarm event and that are in the first alarm event set to a quantity of all alarm events in the first alarm event set, and the resource relationship is used to represent a propagation relationship between the first alarm event and the another alarm event in the first alarm event set.

In an embodiment, the feature vector further includes an alarm context, where the alarm context is used to represent a fault type corresponding to the first alarm event set to which the first alarm event belongs.

In an embodiment, the classification model is determined by training based on at least one training alarm event set and according to a preset classification algorithm, where information about each training alarm event in the at least one training alarm event set includes a label and a feature vector, and the label is used to represent whether each training alarm event is the root cause alarm event; and for any training alarm event in the training alarm event set, where an association attribute of the training alarm event is used to represent an association relationship between the training alarm event and another alarm event in the training alarm event set, the quantity relationship is used to represent a ratio of a total quantity of all training alarm events including the training alarm event that are the same as the training alarm event and that are in the training alarm event set to a quantity of all training alarm events in the training alarm event set, and the resource relationship is used to represent a propagation relationship between the training alarm event and the another alarm event in the training alarm event set.

In an embodiment, the feature vector of each training alarm event in the training alarm event set includes at least one of an alarm severity level, an alarm name, and an event type, and at least one of the association attribute, a time sequence relationship, the quantity relationship, and the resource relationship.

In an embodiment, the at least one training alarm event set is a plurality of training alarm event sets, and the feature vector of each training alarm event in each of the plurality of training alarm event sets further includes an alarm context, where the alarm context of each training alarm event is used to represent a fault type corresponding to the training alarm event set in which each training alarm event is located.

In an embodiment, after the determining whether the first alarm event is a root cause alarm event, the method further includes: receiving a label of each alarm event, in the first alarm event set, that is determined by the classification model and that is manually corrected, and a feature vector of each alarm event, and saving the label and the feature vector of each alarm event to a database used for training the classification model, where the label is used to represent whether each alarm event is the root cause alarm event.

In the method, the classification model training is performed by using the label of the first alarm event that is manually corrected, so that accuracy of the classification model can be improved.

In an embodiment, if the preset classification algorithm is a random forest, the determining whether the first alarm event is a root cause alarm includes: for the first alarm event, determining that the first alarm event is the root cause alarm if determining that a ratio of a decision tree for determining that the first alarm event is the root cause alarm to all decision trees is greater than or equal to a specified threshold; or determining that the first alarm event is a non-root cause alarm if determining that the ratio of the decision tree for determining that the first alarm event is the root cause alarm to all decision trees is less than the specified threshold.

According to a second aspect, an embodiment of the application provides an apparatus, where the apparatus includes: an obtaining unit, configured to obtain a first alarm event set, where the first alarm event set includes a plurality of alarm events; and a processing unit, configured to: for a first alarm event in the first alarm event set, extract a feature vector of the first alarm event, where a part of or all features of the feature vector are used to represent a relationship between the first alarm event and another alarm event in the first alarm event set, where the processing unit is further configured to determine, based on the feature vector of the first alarm event, whether the first alarm event is a root cause alarm event.

In an embodiment, the processing unit is configured to input the feature vector of the first alarm event into a preset classification model, to determine whether the first alarm event is the root cause alarm event, where the classification model is used to represent a relationship between a feature vector and a root cause alarm event.

In an embodiment, the obtaining unit is configured to aggregate the plurality of alarm events into at least one alarm event set, and use one of the at least one alarm event set as the first alarm event set.

In an embodiment, the obtaining unit is configured to aggregate the plurality of alarm events into at least one alarm set according to a specified rule, where the specified rule includes at least one of a time correlation, a topology correlation, and a text similarity, where the time correlation is used to represent an association relationship between alarm events in time, the topology correlation is used to represent an association relationship between the alarm events in physical location, and the text similarity is used to represent a similarity degree between character strings when the alarm events are represented by using the character strings.

In an embodiment, the feature vector includes at least one of an alarm severity level, an alarm name, and an event type, and at least one of an association attribute, a time sequence relationship, a quantity relationship, and a resource relationship, where the association attribute is used to represent a ratio of a total quantity of all alarm events including the first alarm event that are the same as the first alarm event and that are in the first alarm event set to a quantity of all alarm events in the first alarm event set, and the resource relationship is used to represent a propagation relationship between the first alarm event and the another alarm event in the first alarm event set.

In an embodiment, the feature vector further includes an alarm context, where the alarm context is used to represent a fault type corresponding to the first alarm event set to which the first alarm event belongs.

In an embodiment, the classification model is determined by training based on at least one training alarm event set and according to a preset classification algorithm, where information about each training alarm event in the at least one training alarm event set includes a label and a feature vector, and the label is used to represent whether each training alarm event is the root cause alarm event; and for any training alarm event in the training alarm event set, where an association attribute of the training alarm event is used to represent an association relationship between the training alarm event and another alarm event in the training alarm event set, the quantity relationship is used to represent a ratio of a total quantity of all training alarm events including the training alarm event that are the same as the training alarm event and that are in the training alarm event set to a quantity of all training alarm events in the training alarm event set, and the resource relationship is used to represent a propagation relationship between the training alarm event and the another alarm event in the training alarm event set.

In an embodiment, the feature vector of each training alarm event in the training alarm event set includes at least one of an alarm severity level, an alarm name, and an event type, and at least one of the association attribute, a time sequence relationship, the quantity relationship, and the resource relationship.

In an embodiment, the at least one training alarm event set is a plurality of training alarm event sets, and the feature vector of each training alarm event in each of the plurality of training alarm event sets further includes an alarm context, where the alarm context of each training alarm event is used to represent a fault type corresponding to the training alarm event set in which each training alarm event is located.

In an embodiment, after the determining whether the first alarm event is a root cause alarm event, the obtaining unit is further configured to: receive a label of each alarm event, in the first alarm event set, that is determined by the classification model and that is manually corrected, and a feature vector of each alarm event, and save the label and the feature vector of each alarm event to a database used for training the classification model, where the label is used to represent whether each alarm event is the root cause alarm event.

In an embodiment, if the preset classification algorithm is a random forest, the processing unit is configured to:

for the first alarm event, determine that the first alarm event is a root cause alarm if determining that a ratio of a decision tree for determining that the first alarm event is the root cause alarm to all decision trees is greater than or equal to a specified threshold; or determine that the first alarm event is a non-root cause alarm if determining that the ratio of the decision tree for determining that the first alarm event is the root cause alarm to all decision trees is less than the specified threshold.

According to a third aspect, an embodiment of the application further provides an apparatus, including a processor, a memory and a communications interface, where the memory is configured to store a computer program, and the processor is configured to read the computer program stored in the memory and implement the method provided in the first aspect and any design of the first aspect.

According to a fourth aspect, an embodiment of the application further provides a computer-readable storage medium, configured to store a computer software instruction used to perform functions of the first aspect and any design of the first aspect, where the computer-readable storage medium includes a program designed to perform the method according to the first aspect and any design of the first aspect.

According to a fifth aspect, an embodiment of the application provides a computer program product including an instruction. When run on a computer, the computer program product enables the computer to perform the method according to the first aspect and/or any design of the first aspect.

DESCRIPTION OF EMBODIMENTS

Figure 1:
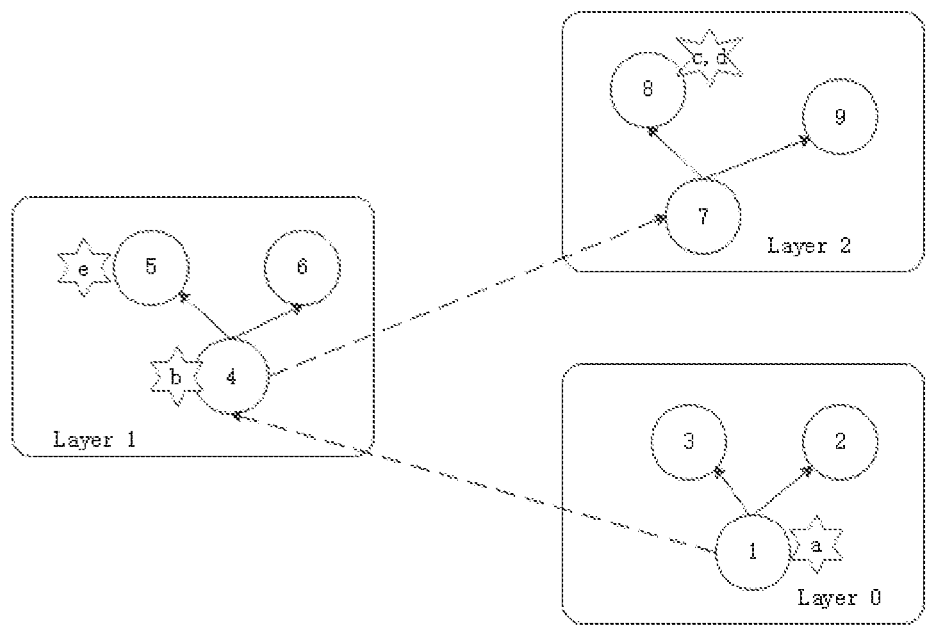
FIG. 1 is a schematic diagram of an alarm event according to an embodiment of the application.
Figure 2:
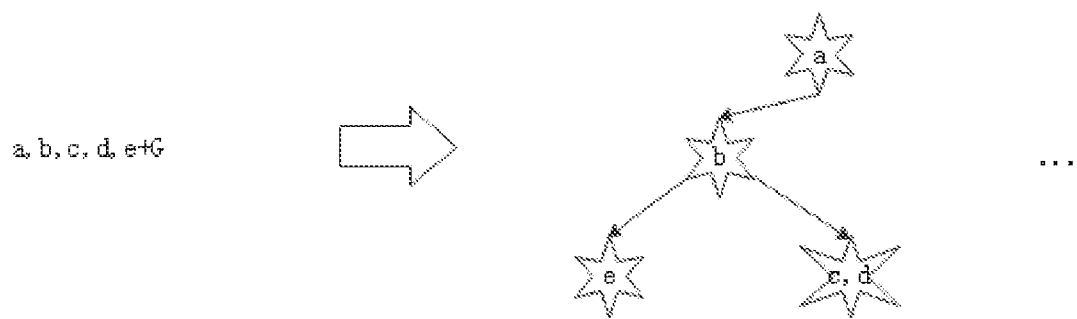
FIG. 2 is a schematic diagram of a resource relationship tree according to an embodiment of the application.
Figure 3:
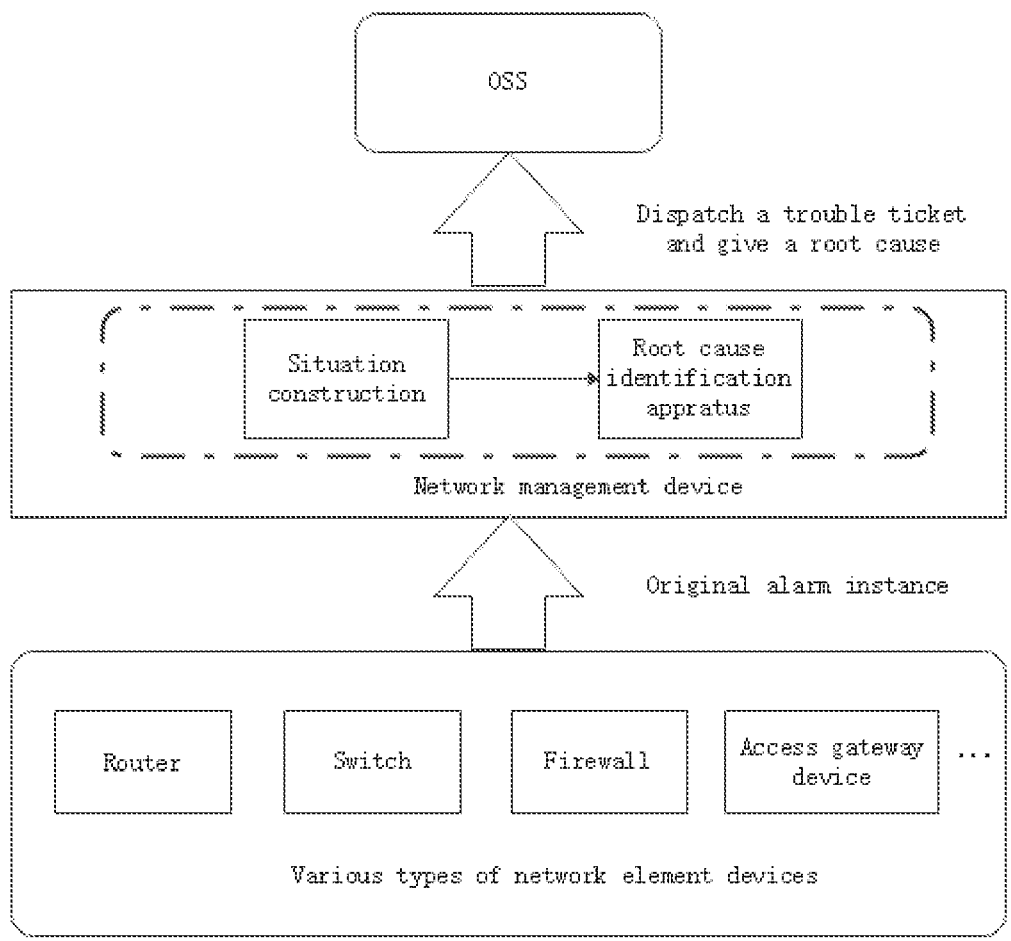
FIG. 3 is a system architecture diagram according to an embodiment of the application.

The following further describes in detail embodiments of this application with reference to accompanying drawings.

The embodiments of this application provide a fault root cause analysis method and apparatus, to resolve a problem in the prior art that accuracy of fault root cause identification is low. The method and the device are based on a same idea. Because problem resolving principles of the method and the device are similar, for implementation of the device and the method, mutual reference may be made, and repeated parts are not described in detail again.

With the expansion of a network scale, a quantity of network devices such as routers, switches, firewalls, load balance devices, and access gateways increases. These network devices report massive alarms to an OSS. However, a large quantity of alarms that do not require attention, such as invalid alarms, and repeated alarms exist in the massive alarms, so that an O&M engineer cannot accurately identify fault root causes from the massive alarms. As a result, a large quantity of trouble tickets are dispatched, wasting manpower and increasing O&M costs. In the prior art, data of an alarm event, for example, a type name of the alarm event, is used to determine whether the alarm event is a root cause and is of low accuracy. Therefore, how to improve the accuracy of the root cause identification is a problem that needs to be resolved currently.

In the following, some terms in this application are described, to help one of ordinary skilled in the art has a better understanding.

(1) An alarm event set, also referred to as a situation, is obtained by aggregating a series of alarm events corresponding to a possible fault, based on at least one dimension of a time correlation, a topology correlation, and a text similarity. For example, it is assumed that an original alarm event set is $A=[a_1, a_2, \ldots, a_n]$, and all situations after aggregation are marked as S, $S=\{s_1: [a_1, \ldots, a_k], \ldots, s_i:[a_p, \ldots, a_q], \ldots, s_r: [a_m, \ldots, a_n]\}$, where r is a quantity of situations, $1 \leq k$, p, and q, and $m < n$. In other words, each situation $s_i$ is a set of a series of alarm events, where the alarm event set may be obtained through aggregation or may be manually determined.

(2) At least one may be one or more. This is not limited in this application.

(3) A classification model is used to represent a relationship between the feature vector and a root cause alarm event, and determine, based on an inputted feature vector of an alarm event, whether the alarm event is the root cause alarm event. The classification model is determined based on at least one training alarm event set and according to a preset classification algorithm, and an alarm event in the training alarm event set is obtained offline. The classification model may be updated at a specified time, and an online real-time alarm event included in a database used during the update may be an alarm event determined by using the classification model and manually corrected.

(4) An alarm severity level is used to represent a level of an alarm event, and may be represented by using a Chinese character string or an English character string. For example, when being represented by using Chinese, the alarm severity level may be five levels: critical, major, minor, warning, and unknown. During data processing, the Chinese character string may be processed as a corresponding feature. The alarm severity levels are progressive and need to be separately encoded. Therefore, critical, major, minor, warning, and unknown can be respectively processed as alarm severity level features 5, 4, 3, 2, and 1. The alarm event carries the alarm severity level when being reported. It is assumed that there are four alarm events in one situation, and alarm severity levels are respectively critical, major, major, and major. In this case, alarm severity level features of the four alarm events are respectively 5, 4, 4, and 4. Codes may alternatively be in another form. This is not limited in this application.

(5) An alarm name is used to represent an attribute of an alarm event, and may represent a specific fault cause. Optionally, the alarm name may further correspond to a recovery operation suggestion. The alarm name may be represented by a discrete Chinese or English character string. For example, the alarm name may be ETH_LOS, MPLS_TUNNEL_LOCV, ETH_APS_LOST, TUNNEL_DOWN, or that a quantity of users of an entire device is decreased to a minimum threshold. Because alarm names are independent of each other, one-hot encoding is used for encoding. It is assumed that alarm names in one situation include ETH_LOS, MPLS_TUNNEL_LOCV, ETH_APS_LOST, TUNNEL_DOWN, and that a quantity of users of an entire device decreases to a minimum threshold. In this case, after the one-hot encoding is performed, codes respectively corresponding to the five alarm names are 00001, 00010, 00100, 01000, and 10000, that is, alarm name features. The codes may alternatively be in another form. This is not limited in this application.

(6) An event type is used to represent a type of an alarm event, and for example, may be classified into a hardware alarm, an environment alarm, a line alarm, a service alarm, a security alarm, and the like. Alternatively, the event type may be encoded through one-hot encoding. It is assumed that event types in one situation include a hardware alarm, an environment alarm, a line alarm, a service alarm, and a security alarm. In this case, after the one-hot encoding is performed, codes respectively corresponding to the five event types are 00001, 00010, 00100, 01000, and 10000, that is, event type features. The codes may alternatively be in another form. This is not limited in this application.

(7) An association attribute is used to represent an association relationship between an alarm event and another alarm event in one situation. For example, the association attribute may be a root cause alarm event, a non-root cause alarm event, or null. Whether an association attribute of each alarm event is marked as the root cause alarm event is determined based on the association relationship between the alarm event and the another alarm event. For example, if an alarm event A causes an alarm event B, the alarm event A is the root cause alarm event for the alarm event B; and in this case, an association attribute of the alarm event A is marked as the root cause alarm event, and an association attribute of the alarm event B is marked as the non-root cause alarm event. If the alarm event is the root cause alarm event, an association attribute is marked as P. If the alarm event is the non-root cause alarm event, an association attribute is marked as C. It is assumed that association attribute labels in one situation are P, C, and null respectively. In this case, after one-hot encoding is performed, codes corresponding to the three association attributes are 001, 010, and 100 respectively, that is, association attribute features. The codes may alternatively be in another form. This is not limited in this application.

(8) A time sequence relationship is used to represent a time sequence of occurrence of an alarm event in one situation, and may further represent a distance relationship between alarm events in time. For example, all alarm events in the situation are first sorted based on an occurrence time of the alarm events, the occurrence time of the alarm events is constructed as a vector $T=[t_1, t_2, \ldots t_i, \ldots, t_n]$, where $1 \le i \le n$. Because duration of different situations is different, normalization needs to be performed, to be specific, a time sequence feature Ti corresponding to an alarm event at a ti moment is equal to $(t_i - \min(T))/(\max(T) - \min(T))$. For example, if there are five alarm events in one situation and occurrence times are respectively 10:01, 10:02, 10:02, 10:02, and 10:08, time sequence relationship features corresponding to the five alarm events are respectively 0.0, 0.14, 0.14, 0.14, and 1.

(9) A quantity relationship is used to represent a ratio of a quantity of same alarm events in one situation to a quantity of all alarm events in the situation. For example, there are Ni i alarm events in the situation, and a quantity of i alarm events is recorded as Ni, a total quantity of alarm events in the situation is N, a quantity relationship feature of the i alarm event is Ci, and $Ci = Ni/N$. In an embodiment, alarm events that are from a same alarm source and have a same alarm name may be considered as a same alarm event.

(10) A resource relationship is used to represent a propagation relationship between alarm events in one situation. In a vertical direction, all alarm events are client-layer alarm events carried by a server-layer alarm event. For example, as shown in FIGS. 1, 1, 2, 3, 4, 5, 6, 7, 8, and 9 represent network elements, and a, b, c, d, and e are alarm events that occur. By combining the alarm events with a directed acyclic graph G, a resource relationship tree of the alarm events in the situation shown in FIG. 2 may be obtained, and the alarm event at the root of the tree is the root cause alarm event, and is marked as 1, and a leaf node is marked as 0. For example, there are five alarm events in one situation. After the resource relationship tree is determined, only the first alarm is at the bottom layer, and the other alarms are at the upper layer. In this case, features of the five alarms are respectively 1, 0, 0, 0, and 0. The directed acyclic graph G that is shown is a diagram in which a physical connection relationship and a logical connection relationship between a network element, a board, and a port is represented based on a network topology and an inventory. Content represented by 1 and 0 is not limited in the embodiments of this application.

(11) An alarm context is used to represent a fault type corresponding to a situation to which an alarm event belongs, for example, a line fault, a transmission fault, a network element unreachability fault, or a mass offline fault. The one-hot encoding may also be used for encoding.

(12) "A plurality of" refers to two or more than two.

In the embodiments of this application, for a feature for which the one-hot encoding is used, it is assumed that the feature has m possible values. After the one-hot encoding, the feature becomes m binary features. When the one-hot encoding is used, a problem that it is inconvenient for a classifier to process attribute data can be resolved, and in addition, the feature is extended to some extent. During data processing, the one-hot encoding needs to be performed for each feature first, and then concatenation is performed. It is assumed that quantities of possible values of each of the three features: the alarm name, the event type, and the association attribute are respectively a, b, and c. In this case, after the one-hot encoding, a feature vector dimension of an alarm is changed from three dimensions to an a+b+c dimension.

In addition, it should be understood that in descriptions of this application, terms such as "first" and "second" are merely used for differentiation and description, but should not be understood as an indication or implication of relative importance or an indication or implication of an order.

In an embodiment of the application, the fault root cause analysis apparatus aggregates at least one alarm event into at least one alarm event set in an alarm event aggregation manner; extracts, from a plurality of dimensions, a feature vector of each alarm event in the at least one alarm set; and inputs the feature vector of each alarm event into a preset classification model determined by machine learning, to determine whether each alarm event is the root cause alarm event. Input of expert manpower is reduced and the accuracy of the root cause identification is improved.

In an embodiment of the application, the fault root cause analysis apparatus may be an independent server, or may be a software module of a network management device. For example, a system architecture in which the fault root cause analysis apparatus is located may be shown in FIG. 3. The fault root cause analysis apparatus may also be referred to as a root cause identification apparatus. Various types of network element devices such as a router, a switch, a firewall, a load balancing device and an access gateway device generate various types of alarm events (which may also be referred to as an alarm log or an original alarm instance). Data of the alarm events is shown in Table 1. Table 1 is merely a simple example, and does not include all features of the alarm events, online real-time alarms can be obtained from a data bus.

TABLE 1

| Association Attribute | Alarm Severity Level | Alarm Name | Alarm Source | Network Element Type | Positioning Information | Occurrence Time | Event type |
|---|---|---|---|---|---|---|---|
| — | Urgent | NE_NOT_LOGIN | Ne1 | PTN xx | ## | 2017 Oct. 15 18:04:25 | Security alarm |
| — | Urgent | NE_NOT_LOGIN | Ne1 | PTN xx | ## | 2017 Oct. 15 18:04:25 | Security alarm |
| Non-root Cause Alarm | Major | MPLS_PW_LOCV | NEx | PTN xx | ## | 2017 Oct. 15 18:04:26 | Communication Quality |
| Root Cause Alarm | Major | ETH_LOS | NEx | PTN xx | ## | 2017 Oct. 15 18:04:26 | Communication Quality |

A network management device receives alarm events sent by various types of network element devices to perform situation construction, determines, by using the fault root cause analysis apparatus, an alarm event in the situation, and determines whether the alarm event is a root cause alarm event. If the alarm event is a root cause, a trouble ticket is dispatched to an OSS. In an embodiment of the application, the situation can also be constructed in the fault root cause analysis device.

Figure 4:
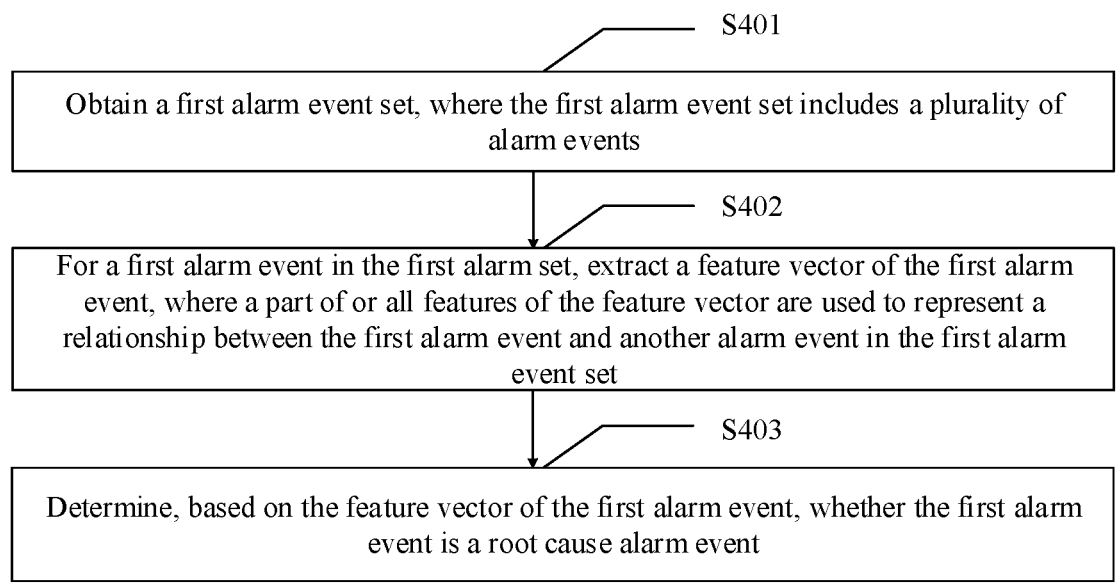
FIG. 4 is a flowchart of a fault root cause analysis method according to an embodiment of the application.

With reference to FIG. 4, the following describes in detail a solution in which the situation is constructed in the foregoing system architecture and the fault root cause analysis apparatus determines whether the alarm event is the root cause alarm event. For example, FIG. 4 is a flowchart of a fault root cause analysis method according to an embodiment of the application. The method includes the following operations.

Operation S401. The fault root cause analysis apparatus obtains a first alarm event set, where the first alarm event set includes a plurality of alarm events.

Operation S402. The fault root cause analysis apparatus extracts a feature vector of a first alarm event in the first alarm set, where a part of or all features of the feature vector are used to represent a relationship between the first alarm event and another alarm event in the first alarm event set.

For example, the feature vector includes at least one of an alarm severity level, an alarm name, and an event type, and at least one of an association attribute, a time sequence relationship, a quantity relationship, and a resource relationship. Optionally, the feature vector further includes an alarm context. The association attribute is used to represent an association relationship between the first alarm event and the another alarm event in the first alarm event set, the quantity relationship is used to represent a ratio of a total quantity of all alarm events including the first alarm event that are the same as the first alarm event and that are in the first alarm event set to a quantity of all alarm events in the first alarm event set, and the resource relationship is used to represent a propagation relationship between the first alarm event and the another alarm event in the first alarm event set, and the alarm context is used to represent a fault type corresponding to the first alarm event set.

Operation S403. Determine, based on the feature vector of the first alarm event, whether the first alarm event is a root cause alarm event.

For example, the fault root cause analysis apparatus inputs a feature vector of each alarm event into a preset classification model, where the classification model is used to represent a relationship between a feature vector and a root cause alarm event.

The classification model may be determined by training based on at least one training alarm event set and according to a preset classification algorithm, where information about each training alarm event in the at least one training alarm event set includes a label and a feature vector, and the label is used to represent whether each training alarm event is the root cause alarm event. For any training alarm event in the training alarm event set, where an association attribute of the training alarm event is used to represent an association relationship between the training alarm event and another alarm event in the training alarm event set, the quantity relationship is used to represent a ratio of a total quantity of all training alarm events including the training alarm event that are the same as the training alarm event and that are in the training alarm event set to a quantity of all training alarm events in the training alarm event set, and the resource relationship is used to represent a propagation relationship between the training alarm event and the another alarm event in the training alarm event set.

The at least one training alarm event set may be a plurality of training alarm event sets, and the feature vector of each training alarm event in each of the plurality of training alarm event sets may further include an alarm context, where the alarm context of each training alarm event is used to represent a fault type corresponding to the training alarm event set in which each training alarm event is located.

It may be understood that, the feature vector that is of the training alarm event and that is used during the training of the classification model is usually consistent with the feature vector that is of the first alarm event and that is extracted in operation S402. For example, the feature vector that is of the training alarm event and that is used during the training of the classification model includes the alarm severity level, the alarm name, the event type, the association attribute, the time sequence relationship, and the quantity relationship. Correspondingly, the feature vector that is of the first alarm event and that is extracted in operation S402 also includes the alarm severity level, the alarm name, the event type, the association attribute, the time sequence relationship, and the quantity relationship.

In an embodiment of the application, the fault root cause analysis apparatus extracts the feature vector of the first alarm event in the first alarm set from a plurality of dimensions, and determines, by using the feature vector of the relationship between the first alarm event and the another alarm event, whether the first alarm event is the root cause alarm event, thereby improving the accuracy of the fault root cause identification.

A method for processing another alarm event in the first alarm event set is the same as that for processing the first alarm event. Details are not described herein again in the present disclosure.

In an embodiment, before operation S401, the method further includes: aggregating the plurality of alarm events into at least one alarm event set, and using one of the at least one alarm event set as the first alarm event set.

For example, the plurality of alarm events are aggregated into the at least one alarm event set according to the specified rule. The specified rule includes one or more of a time correlation, a topology correlation, and a text similarity. This is not limited in this application. The time correlation is used to represent an association relationship between alarm events in time. For example, alarm events at a close time have relatively good correlations, and alarm events at a closer time are more likely to belong to a same fault, and should be aggregated into one alarm set. The topology correlation is used to represent an association relationship between the alarm events in physical location. For example, from a perspective of a spatial topology, alarm events which are close in physical locations have better correlations, and closer alarm events are more likely to belong to the same fault, and should be aggregated into one alarm set. The text similarity is used to represent a similarity degree between character strings when the alarm events are represented by using the character strings. For example, an alarm name, an alarm source, and alarm location information of an alarm event are concatenated into a character string, and text similarity degrees between character strings of different alarm events are compared. It is considered that alarm events with higher text similarities are more likely to belong to the same fault, and the alarm events should be aggregated into one alarm set.

In an embodiment, after operation S404, the method further includes: receiving a label of each alarm event, in the first alarm event set, that is determined by the classification model and that is manually corrected, and a feature vector of each alarm event, and saving the label and the feature vector of each alarm event to a database used for training the classification model, where the label is used to represent whether each alarm event is the root cause alarm event.

continuously updated database, or may be periodically updated. Data added to the continuously updated database is a label and a feature vector that are corresponding to the alarm event and that are corrected by the O&M engineer. An initial classification model may be determined by training based on the at least one training alarm event set and the preset classification algorithm. The alarm event in the training alarm event set may be obtained from a single-node system or a distributed database. This is not limited in this application.

In an embodiment, if the first alarm event set includes only one alarm event, the alarm event is directly determined as the root cause alarm event, or a feature that represents a relationship between the alarm event and the another alarm event may be set to a default value. In addition, whether the alarm event is the root cause alarm event is determined according to the method in operations S401 to S403.

Figure 5:
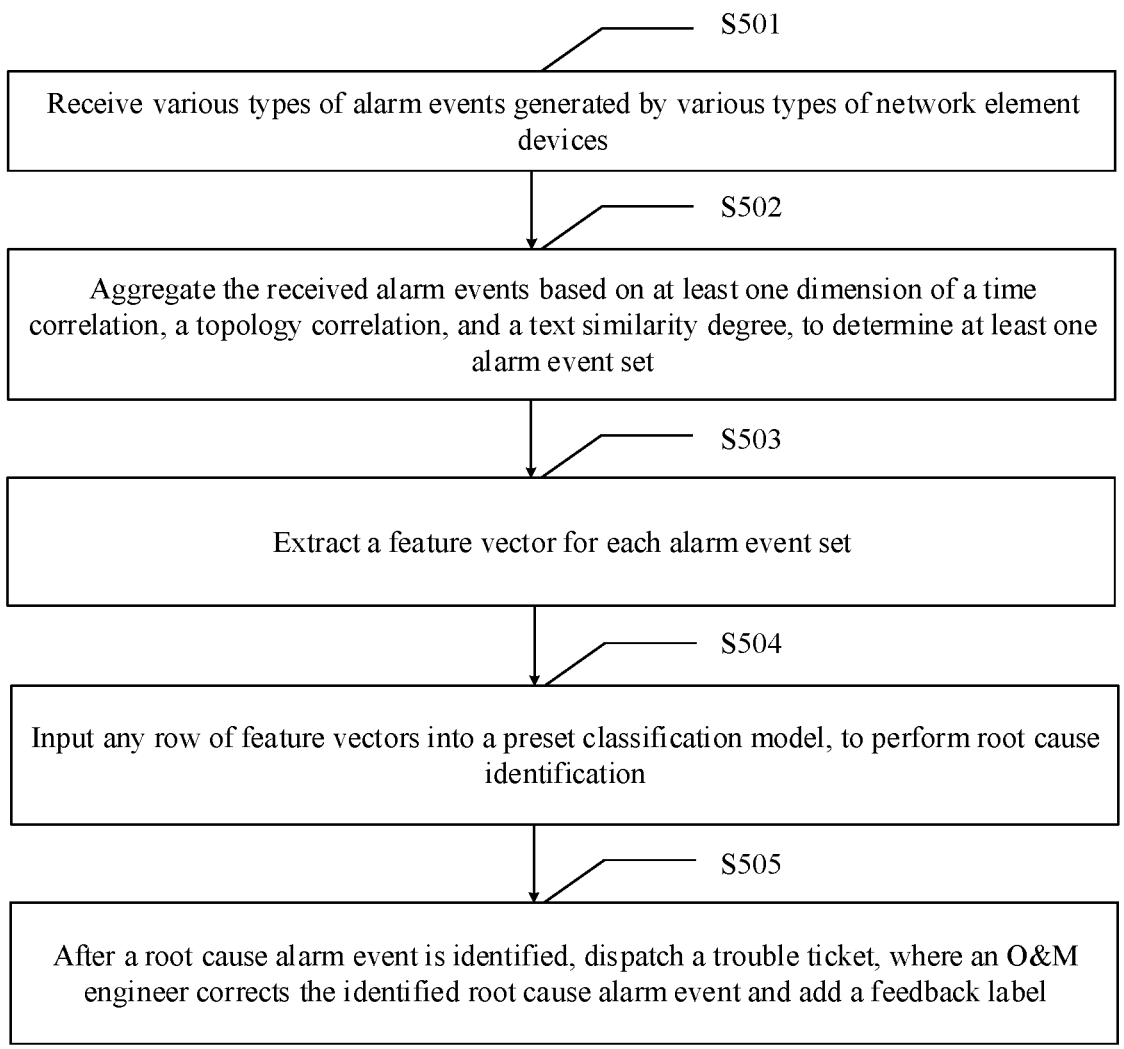
FIG. 5 is a flowchart of another fault root cause analysis method according to an embodiment of the application.

The fault root cause analysis method provided in this application is describes in detail in the following by using a complete embodiment. Details are shown in FIG. 5.

Operation S501. Receive various types of alarm events generated by various types of network element devices.

Operation S502. Aggregate the received alarm events based on at least one dimension of a time correlation, a topology correlation, and a text similarity degree, to determine at least one alarm event set.

Operation S503. Extract a feature vector for each alarm event set.

For example, after feature vectors are extracted from the alarm event set and encoded, a feature vector matrix shown in the following Table 2 may be generated. In Table 2, f0 represents an alarm severity level, a combination of f11, f12, f13, and f14 represents an alarm name, a combination of f21 and f22 represents an event type, a combination of f31, f32, and f33 represents an association attribute, f4 represents a time sequence relationship, f5 represents a quantity relationship, f6 represents a resource relationship, and a combination of f71 and f72 represents an alarm context.

TABLE 2

| f0 | f11 | f12 | f13 | f14 | f21 | f22 | f31 | f32 | f33 | f4 | f5 | f6 | f71 | f72 |
|---|---|---|---|---|---|---|---|---|---|---|---|---|---|---|
| 5 | 0 | 0 | 0 | 1 | 0 | 1 | 0 | 0 | 1 | 0 | 0.29 | 1 | 0 | 1 |
| 3 | 0 | 0 | 1 | 0 | 0 | 1 | 0 | 1 | 0 | 0.25 | 0.71 | 0 | 0 | 1 |
| 4 | 0 | 0 | 1 | 0 | 0 | 1 | 1 | 0 | 0 | 0.25 | 0.71 | 0 | 0 | 1 |
| 3 | 0 | 0 | 1 | 0 | 0 | 1 | 0 | 1 | 0 | 0.25 | 0.71 | 0 | 0 | 1 |
| 3 | 0 | 0 | 1 | 0 | 0 | 1 | 0 | 1 | 0 | 0.25 | 0.71 | 0 | 0 | 1 |
| 5 | 0 | 0 | 0 | 1 | 0 | 1 | 0 | 0 | 1 | 0 | 0.29 | 1 | 0 | 1 |
| 3 | 0 | 0 | 1 | 0 | 0 | 1 | 0 | 1 | 0 | 0.25 | 0.71 | 0 | 0 | 1 |
| 5 | 0 | 1 | 0 | 0 | 1 | 0 | 0 | 0 | 1 | 0 | 0.5 | 0 | 1 | 0 |
| 5 | 1 | 0 | 0 | 0 | 0 | 1 | 0 | 1 | 0 | 0 | 0.5 | 0 | 1 | 0 |
| 5 | 0 | 1 | 0 | 0 | 1 | 0 | 0 | 0 | 1 | 0.1 | 0.5 | 0 | 1 | 0 |
| 5 | 1 | 0 | 0 | 0 | 0 | 1 | 0 | 1 | 0 | 0.1 | 0.5 | 0 | 1 | 0 |
| 5 | 0 | 1 | 0 | 0 | 1 | 0 | 0 | 0 | 1 | 1 | 0.5 | 0 | 1 | 0 |
| 5 | 1 | 0 | 0 | 0 | 0 | 1 | 0 | 1 | 0 | 1 | 0.5 | 0 | 1 | 0 |

For example, if the classification model determines that the event is the root cause alarm event and the event is marked as 1, an O&M engineer finds that the event is a non-root cause alarm event after a trouble ticket is dispatched, the O&M engineer manually correct the event and mark the event as 0. In an embodiment of the application, 1 and 0 may respectively represent the non-root cause alarm event and the root cause alarm event. This is not limited in this application.

In an embodiment of the application, when the classification model is used to determine the alarm event in real time, the classification model may be updated based on a Operation S504. Input any row of feature vectors in Table 2 into a preset classification model, to perform root cause identification.

For example, a classification algorithm used in the classification model may be an SVM, a GBDT, a decision tree, a random forest, a Bayesian classifier, and a neural network, but is not limited to the foregoing algorithm. This is not limited in this application.

Figure 6:
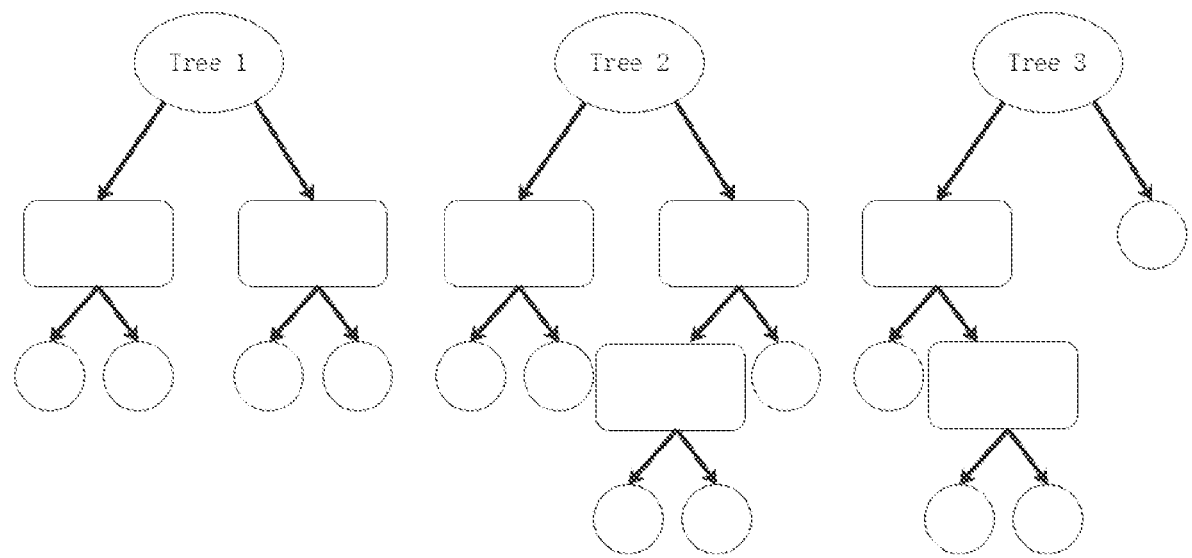
FIG. 6 is a schematic diagram of a random forest according to an embodiment of the application.

The random forest algorithm is used as an example. During root cause identification, a ratio of a decision tree for determining that an alarm event corresponding to any row of feature vectors is a root cause alarm to all decision trees is calculated. If the ratio is greater than or equal to a specified threshold, the alarm event is determined as the root cause alarm, if it is determined that the ratio of the decision tree for determining that the alarm event is the root cause alarm to all decision trees is less than the specified threshold, the alarm event is determined as a non-root cause alarm. For example, it is assumed that the random forest classification model with m decision trees identifies an alarm event A. In this case, if m1 decision trees determine that the alarm event A is a root cause and m1>m/2, an output of the random forest classification model is that the alarm event A is a root cause alarm event. A schematic diagram of a random forest decision tree is shown in FIG. 6.

For example, the random forest algorithm is: (1) It is assumed that a total quantity of samples in a training set is N, and a total quantity of features is F. (2) n samples are generated from the training set in a random resampling manner with playback, to form a single training set. (3) For the single training set, k features are selected from the F features, an optimal segmentation point is obtained by establishing the decision tree, and one CART decision tree is generated. (4) Operation (2) and operation (3) are repeated for m times to generate m decision trees, where m is input from external configuration. (5) The m decision trees are combined to form a random forest model.

A training process of each CART decision tree is as follows: (1) It is assumed that a training data set of a node is D, and the CART decision tree is a binary tree. The process of training the CART decision tree is to continuously divide a data set D into two branches until an algorithm stop condition is met. The split point is selected by calculating a Gini index. (2) The stop condition is set: A quantity of samples in the node is less than a preset threshold, or a Gini index of a sample set is less than a preset threshold, or there is no more feature. (3) For a feature fi, fi∈F, all possible values of fi may be A, and a is a specific value. The data set can be divided into two subsets A=a, that is D1, and A!=a, that is, D2, and a Gini index of the set D is calculated:

$$Gini(D, A) = \frac{|D_1|}{|D|} Gini(D_1) + \frac{|D_2|}{|D|} Gini(D_2);$$

(4) All values of the feature fi are traversed to find a maximum value of the Gini index to be a segmentation point corresponding to the feature. (5) All features are traversed to find a largest feature of the Gini index to be a split feature. So far, the data set D may be divided into two subsets. In other words, selection of the optimal segmentation point for a specific feature is completed. (6) Operations (3), (4), and (5) for the two subnodes are recursively invoked until the stop condition is met. (7) The CART decision tree is generated, and m CART decision trees are generated and stored to obtain a classification model after offline training.

Operation S505. After the root cause alarm event is identified, a trouble ticket is dispatched, and an O&M engineer corrects the identified root cause alarm event and add a feedback label. If being correctly determined by the classification model, the root cause alarm event is marked as 1; if being incorrectly determined by the classification model, the root cause alarm event is marked as 0. The marked value is added to the feature vector matrix in Table 2 to generate Table 3. The first column in Table 3 includes feedback labels, and the generated Table 3 is updated to a database to be a training alarm event set of the classification model.

TABLE 3

| label | f0 | f11 | f12 | f13 | f14 | f21 | f22 | f31 | f32 | f33 | f4 | f5 | f6 | f71 | f72 |
|---|---|---|---|---|---|---|---|---|---|---|---|---|---|---|---|
| 1 | 5 | 0 | 0 | 0 | 1 | 0 | 0 | 1 | 0 | 0 | 0 | 0.29 | 1 | 0 | 1 |
| 0 | 3 | 0 | 0 | 1 | 0 | 0 | 1 | 0 | 1 | 0 | 0.25 | 0.71 | 0 | 0 | 1 |
| 0 | 4 | 0 | 0 | 1 | 0 | 0 | 1 | 1 | 0 | 0 | 0.25 | 0.71 | 0 | 0 | 1 |
| 0 | 3 | 0 | 0 | 1 | 0 | 0 | 1 | 0 | 1 | 0 | 0.25 | 0.71 | 0 | 0 | 1 |
| 0 | 3 | 0 | 0 | 1 | 0 | 0 | 1 | 0 | 1 | 0 | 0.25 | 0.71 | 0 | 0 | 1 |
| 1 | 5 | 0 | 0 | 0 | 1 | 0 | 0 | 1 | 0 | 0 | 0 | 0.29 | 1 | 0 | 1 |
| 0 | 3 | 0 | 0 | 1 | 0 | 0 | 1 | 0 | 1 | 0 | 0.25 | 0.71 | 0 | 0 | 1 |
| 1 | 5 | 0 | 1 | 0 | 0 | 1 | 0 | 0 | 0 | 1 | 0 | 0.5 | 0 | 1 | 0 |
| 0 | 5 | 1 | 0 | 0 | 0 | 0 | 1 | 0 | 1 | 0 | 0 | 0.5 | 0 | 1 | 0 |
| 1 | 5 | 0 | 1 | 0 | 0 | 1 | 0 | 0 | 0 | 1 | 0.1 | 0.5 | 0 | 1 | 0 |
| 0 | 5 | 1 | 0 | 0 | 0 | 0 | 1 | 0 | 1 | 0 | 0.1 | 0.5 | 0 | 1 | 0 |
| 1 | 5 | 0 | 1 | 0 | 0 | 1 | 0 | 0 | 0 | 1 | 1 | 0.5 | 0 | 1 | 0 |
| 0 | 5 | 1 | 0 | 0 | 0 | 0 | 1 | 0 | 1 | 0 | 1 | 0.5 | 0 | 1 | 0 |

In an embodiment of the application, the classification model is determined by training based on at least one training alarm event set and according to a preset classification algorithm, where information about each training alarm event in the at least one training alarm event set includes a label and a feature vector, that is, content shown in Table 3, and the label is used to represent whether each training alarm event is the root cause alarm event.

In an embodiment of the application, when the classification model is trained, training data is obtained only by requiring an ordinary O&M engineer to simply determine in the daily work whether the root cause alarm event is correctly identified by the fault root cause analysis apparatus. Without requiring expert input, manpower input is reduced. It is universal and does not need to be specific to different products. Networking is redesigned and developed to avoid repeated input. With reference to different data, multi-dimensional features are extracted to ensure accuracy of the algorithm. In addition, by continuous learning, a new model is obtained, and the identification accuracy gradually improved.

Figure 7:
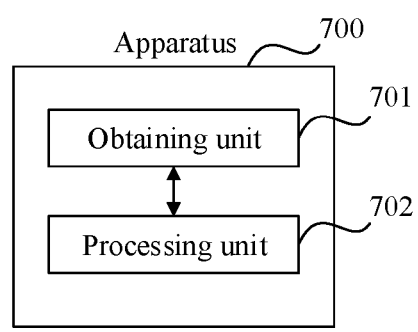
FIG. 7 is a schematic diagram of an apparatus according to an embodiment of the application.

Based on a same inventive concept as the method embodiment, this application further provides a schematic diagram of an apparatus. As shown in FIG. 7, the apparatus includes an obtaining unit 701, configured to obtain a first alarm event set, where the first alarm event set includes a plurality of alarm events; and a processing unit 702, configured to: for a first alarm event in the first alarm event set, extract a feature vector of the first alarm event, where a part of or all features of the feature vector are used to represent a relationship between the first alarm event and another alarm event in the first alarm event set, where the processing unit 702 is further configured to determine, based on the feature vector of the first alarm event, whether the first alarm event is a root cause alarm event.

In an embodiment, the processing unit is configured to input the feature vector of the first alarm event into a preset classification model, to determine whether the first alarm event is the root cause alarm event, where the classification model is used to represent a relationship between a feature vector and a root cause alarm event.

In an embodiment, the obtaining unit is configured to aggregate the plurality of alarm events into at least one alarm event set, and use one of the at least one alarm event set as the first alarm event set.

Optionally, the obtaining unit is configured to aggregate the plurality of alarm events into at least one alarm set according to a specified rule, where the specified rule includes at least one of a time correlation, a topology correlation, and a text similarity.

For example, the feature vector includes at least one of an alarm severity level, an alarm name, and an event type, and at least one of an association attribute, a time sequence relationship, a quantity relationship, and a resource relationship, where the association attribute is used to represent an association relationship between the first alarm event and the another alarm event in the first alarm event set, the quantity relationship is used to represent a ratio of a total quantity of all alarm events including the first alarm event that are the same as the first alarm event and that are in the first alarm event set to a quantity of all alarm events in the first alarm event set, and the resource relationship is used to represent a propagation relationship between the first alarm event and the another alarm event in the first alarm event set.

In an embodiment, the feature vector further includes an alarm context, where the alarm context is used to represent a fault type corresponding to the first alarm event set to which the first alarm event belongs.

In an embodiment, the classification model is determined by training based on at least one training alarm event set and according to a preset classification algorithm, where information about each training alarm event in the at least one training alarm event set includes a label and a feature vector, and the label is used to represent whether each training alarm event is the root cause alarm event; and for any training alarm event in the training alarm event set, where an association attribute of the training alarm event is used to represent an association relationship between the training alarm event and another alarm event in the training alarm event set, the quantity relationship is used to represent a ratio of a total quantity of all training alarm events including the training alarm event that are the same as the training alarm event and that are in the training alarm event set to a quantity of all training alarm events in the training alarm event set, and the resource relationship is used to represent a propagation relationship between the training alarm event and the another alarm event in the training alarm event set.

In an embodiment, the feature vector of each training alarm event in the training alarm event set includes at least one of an alarm severity level, an alarm name, and an event type, and at least one of the association attribute, a time sequence relationship, the quantity relationship, and the resource relationship.

In an embodiment, the at least one training alarm event set is a plurality of training alarm event sets, and the feature vector of each training alarm event in each of the plurality of training alarm event sets further includes an alarm context, where the alarm context of each training alarm event is used to represent a fault type corresponding to the training alarm event set in which each training alarm event is located.

In an embodiment, after the determining whether the first alarm event is a root cause alarm event, the obtaining unit is further configured to: receive a label of each alarm event, in the first alarm event set, that is determined by the classification model and that is manually corrected, and a feature vector of each alarm event, and save the label and the feature vector of each alarm event to a database used for training the classification model, where the label is used to represent whether each alarm event is the root cause alarm event.

In an embodiment, if the preset classification algorithm is a random forest, the processing unit is configured to: for the first alarm event, determine that the first alarm event is a root cause alarm if determining that a ratio of a decision tree for determining that the first alarm event is the root cause alarm to all decision trees is greater than or equal to a specified threshold; or determine that the first alarm event is a non-root cause alarm if determining that the ratio of the decision tree for determining that the first alarm event is the root cause alarm to all decision trees is less than the specified threshold.

Division of the modules in the embodiments of this application is only an example, and is merely logical function division. There may be other division manners according to an embodiment of the application. In addition, the functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 8:
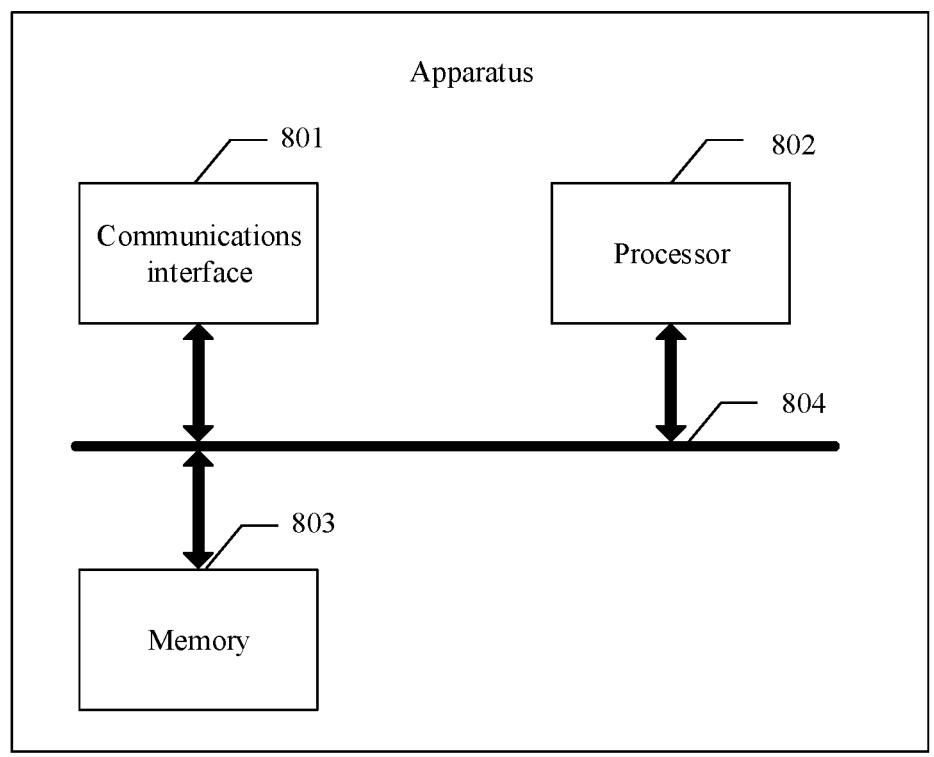
FIG. 8 is a structural diagram of hardware according to an embodiment of the application.

When the integrated module may be implemented in a form of hardware, as shown in FIG. 8, an apparatus may include a processor 802. A hardware entity corresponding to the processing unit 702 may be the processor 802. The processor 802 may be a central processing module (CPU), a digital processing module, or the like. The device may further include a communications interface 801 (which may be a transceiver), and a hardware entity corresponding to the obtaining unit 701 may be the communications interface 801. The device may further include a memory 803, configured to store a program executed by the processor 802. The memory 803 may be a nonvolatile memory such as a hard disk (HDD) or a solid-state drive (SSD), or may be a volatile memory, for example, a random-access memory (RAM). The memory 803 is any other medium that can carry or store expected program code in a form of an instruction or a data structure and can be accessed by a computer, but is not limited thereto.

The processor 802 is configured to execute the program code stored in the memory 803, and is configured to perform the method described in the embodiments shown in FIG. 4 and FIG. 5. The method described in the embodiments shown in FIG. 4 and FIG. 5 may be referred to. Details are not described herein again.

A specific connection medium between the communications interface 801, the processor 802, and the memory 803 are not limited in an embodiment of the application. In an embodiment of the application, in FIG. 8, the memory 803, the processor 802, and the communications interface 801 are connected to each other by using a bus 804. The bus is represented by using a thick line in FIG. 8. A manner of connection between other components is only schematically described, but is not used as a limitation. The bus may be classified into an address bus, a data bus, a control bus, and the like. For ease of representation, only one thick line is used to represent the bus in FIG. 8, but this does not mean that there is only one bus or only one type of bus.

An embodiment of this application further provides a computer-readable storage medium, configured to store a computer software instruction that needs to be executed for execution of the foregoing processor, and the computer-readable storage medium includes a program that needs to be executed for the execution of the foregoing processor.

One of ordinary skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

In this application, "and/or" describes an association relationship for describing associated objects and represents that three relationships may exist. For example, A and/or B may represent the following three cases: Only A exists, both A and B exist, and only B exists. A, and B may be singular or plural. The character "/" generally indicates an "or" relationship between the associated objects.

In this application, "at least one" refers to one or more, and "a plurality of" refers to two or more. "At least one (one piece) of the following" or a similar expression thereof refers to any combination of these items, including any combination of singular items (pieces) or plural items (pieces). For example, "at least one (one piece) of a, b, or c" or "at least one (one piece) of a, b, and c" may represent: a, b, c, a-b (that is, a and b), a-c, b-c, or a-b-c, where a, b, and c may be singular or plural.

It should also be understood that sequence numbers of the foregoing processes do not mean execution sequences in various embodiments of this application. Some or all operations can be executed in parallel or sequentially. The execution sequences of the processes should be determined according to functions and internal logic of the processes, and should not be construed as any limitation on the implementation processes of the embodiments of this application.

This application is described with reference to the flowcharts and/or block diagrams of the method, the device (system), and the computer program product according to an embodiment of the application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may further be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may further be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, one of ordinary skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A fault root cause analysis method, comprising:
obtaining a first alarm event set comprising a plurality of alarm events;
for a first alarm event in the first alarm event set, extracting a feature vector of the first alarm event, wherein at least a portion of features of the feature vector is used to represent a relationship between the first alarm event and another alarm event in the first alarm event set; and
determining, based on the feature vector of the first alarm event, whether the first alarm event is a root cause alarm event, wherein the feature vector comprises at least one of a time sequence relationship, a quantity relationship, or a resource relationship between the first alarm event and the another alarm event in the first alarm event set, wherein the quantity relationship is used to represent a ratio of a total quantity of all alarm events comprising the first alarm event that are the same as the first alarm event and that are in the first alarm event set to a quantity of all alarm events in the first alarm event set, and wherein the resource relationship is used to represent a propagation relationship between the first alarm event and the another alarm event in the first alarm event set.

2. The method according to claim 1, wherein the determining whether the first alarm event is the root cause alarm event comprises:
inputting the feature vector of the first alarm event into a preset classification model, to determine whether the first alarm event is the root cause alarm event.

3. The method according to claim 1, wherein the obtaining the first alarm event set comprises:
aggregating the plurality of alarm events into at least one alarm event set, and using one of the at least one alarm event set as the first alarm event set.

4. The method according to claim 3, wherein the aggregating the plurality of alarm events into at least one alarm event set comprises:
aggregating the plurality of alarm events into at least one alarm event set according to a specified rule, wherein the specified rule comprises at least one of a time correlation, a topology correlation, and a text similarity, wherein the time correlation is used to represent an association relationship between alarm events in time, wherein the topology correlation is used to represent an association relationship between the alarm events in physical location, and wherein the text similarity is used to represent a similarity degree between character strings when the alarm events are represented by using the character strings.

5. The method according to claim 1, wherein the feature vector further comprises an alarm context, and wherein the alarm context is used to represent a fault type corresponding to the first alarm event set.

6. The method according to claim 2, wherein the classification model is determined by training based on at least one training alarm event set and according to a preset classification algorithm, wherein information about each training alarm event in the at least one training alarm event set comprises a label and a feature vector, and wherein the label is used to represent whether each training alarm event is the root cause alarm event; and wherein for any training alarm event in the training alarm event set, an association attribute of the training alarm event is used to represent an association relationship between the training alarm event and another alarm event in the training alarm event set, wherein the quantity relationship is used to represent a ratio of a total quantity of all training alarm events comprising the training alarm event that are the same as the training alarm event and that are in the training alarm event set to a quantity of all training alarm events in the training alarm event set, and wherein the resource relationship is used to represent a propagation relationship between the training alarm event and the another alarm event in the training alarm event set.

7. The method according to claim 6, wherein the feature vector of each training alarm event in the training alarm event set comprises at least one of an alarm severity level, an alarm name, or an event type, and at least one of the association attribute, a time sequence relationship, the quantity relationship, or the resource relationship.

8. The method according to claim 6, wherein after determining whether the first alarm event is the root cause alarm event, the method further comprises:

receiving a label of each alarm event, in the first alarm event set, that is determined by the classification model and that is manually corrected, and a feature vector of each alarm event, and saving the label and the feature vector of each alarm event to a database used for training the classification model, wherein the label is used to represent whether each alarm event is the root cause alarm event.

9. The method according to claim 6, wherein when the preset classification algorithm is a random forest, the determining whether the first alarm event is the root cause alarm comprises:

for the first alarm event, determining that the first alarm event is the root cause alarm if a ratio of a decision tree for determining that the first alarm event is the root cause alarm to all decision trees is greater than or equal to a specified threshold; or determining that the first alarm event is a non-root cause alarm if the ratio of the decision tree for determining that the first alarm event is the root cause alarm to all decision trees is less than the specified threshold.

10. An apparatus, comprising:

a processor; and a non-transitory computer readable medium which contains computer-executable instructions, which when executed by the processor, cause the apparatus to perform operations comprising:

obtaining a first alarm event set comprising a plurality of alarm events;

for a first alarm event in the first alarm event set, extracting a feature vector of the first alarm event, wherein at least a portion of features of the feature vector is used to represent a relationship between the first alarm event and another alarm event in the first alarm event set; and determining, based on the feature vector of the first alarm event, whether the first alarm event is a root cause alarm event, wherein the feature vector comprises at least one of a time sequence relationship, a quantity relationship, or a resource relationship, wherein the quantity relationship is used to represent a ratio of a total quantity of all alarm events comprising the first alarm event that are the same as the first alarm event and that are in the first alarm event set to a quantity of all alarm events in the first alarm event set, and wherein the resource relationship is used to represent a propagation relationship between the first alarm event and the another alarm event in the first alarm event set.

11. The apparatus according to claim 10, wherein determining whether the first alarm event is the root cause alarm event comprises:

inputting the feature vector of the first alarm event into a preset classification model, to determine whether the first alarm event is the root cause alarm event.

12. The apparatus according to claim 10, wherein obtaining the first alarm event set comprises:

aggregating the plurality of alarm events into at least one alarm event set, and using one of the at least one alarm event set as the first alarm event set.

13. The apparatus according to claim 12, wherein aggregating the plurality of alarm events into at least one alarm event set comprises:

aggregating the plurality of alarm events into at least one alarm event set according to a specified rule, wherein the specified rule comprises at least one of a time correlation, a topology correlation, and a text similarity, wherein the time correlation is used to represent an association relationship between alarm events in time, wherein the topology correlation is used to represent an association relationship between the alarm events in physical location, and wherein the text similarity is used to represent a similarity degree between character strings when the alarm events are represented by using the character strings.

14. The apparatus according to claim 10, wherein the feature vector further comprises an alarm context, and wherein the alarm context is used to represent a fault type corresponding to the first alarm event set.

15. The apparatus according to claim 11, wherein the classification model is determined by training based on at least one training alarm event set and according to a preset classification algorithm, wherein information about each training alarm event in the at least one training alarm event set comprises a label and a feature vector, and wherein the label is used to represent whether each training alarm event is the root cause alarm event; and wherein for any training alarm event in the training alarm event set, an association attribute of the training alarm event is used to represent an association relationship between the training alarm event and another alarm event in the training alarm event set, wherein the quantity relationship is used to represent a ratio of a total quantity of all training alarm events comprising the training alarm event that are the same as the training alarm event and that are in the training alarm event set to a quantity of all training alarm events in the training alarm event set, and wherein the resource relationship is used to represent a propagation relationship between the training alarm event and the another alarm event in the training alarm event set.

16. The apparatus according to claim 15, wherein the feature vector of each training alarm event in the training alarm event set comprises at least one of an alarm severity level, an alarm name, or an event type, and at least one of the association attribute, a time sequence relationship, the quantity relationship, or the resource relationship.

17. The apparatus according to claim 15, wherein the operations further comprise:
receiving a label of each alarm event, in the first alarm event set, that is determined by the classification model and that is manually corrected, and a feature vector of each alarm event, and saving the label and the feature vector of each alarm event to a database used for training the classification model, wherein the label is used to represent whether each alarm event is the root cause alarm event.

18. A non-transitory computer-readable medium for storing instructions, which when executed by a processor, cause the processor to perform operations comprising:
obtaining a first alarm event set comprising a plurality of alarm events;
for a first alarm event in the first alarm event set, extracting a feature vector of the first alarm event, wherein at least a portion of features of the feature vector is used to represent a relationship between the first alarm event and another alarm event in the first alarm event set; and
determining, based on the feature vector of the first alarm event, whether the first alarm event is a root cause alarm event, wherein the feature vector comprises at least one of a time sequence relationship, a quantity relationship, or a resource relationship, wherein the quantity relationship is used to represent a ratio of a total quantity of all alarm events comprising the first alarm event that are the same as the first alarm event and that are in the first alarm event set to a quantity of all alarm events in the first alarm event set, and wherein the resource relationship is used to represent a propagation relationship between the first alarm event and the another alarm event in the first alarm event set.

19. The method according to claim 1, wherein the feature vector further comprises the alarm severity level, an alarm name, an event type, or an association attribute used to represent an association relationship between the first alarm event and the another alarm event in the first alarm event set.

20. The apparatus according to claim 10, wherein the feature vector further comprises the alarm severity level, an alarm name, an event type, or an association attribute used to represent an association relationship between the first alarm event and the another alarm event in the first alarm event set.

* * * * *